United States Patent [19]
Lai

[11] Patent Number: 5,384,803
[45] Date of Patent: Jan. 24, 1995

[54] LASER WAVE MIXING AND HARMONIC GENERATION OF LASER BEAMS

[76] Inventor: Shui T. Lai, 1223 Orchard Glen Cir., Encinitas, Calif. 92024

[21] Appl. No.: 20,756

[22] Filed: Feb. 22, 1993

[51] Int. Cl.⁶ .............................................. H01S 3/08
[52] U.S. Cl. ..................................... 372/100; 372/22; 372/23; 372/108; 372/21
[58] Field of Search ...................... 372/20, 21, 22, 100, 372/108, 23

[56] References Cited

U.S. PATENT DOCUMENTS

| | | | |
|---|---|---|---|
| 4,081,760 | 3/1978 | Berg | 378/100 |
| 4,970,383 | 11/1990 | Caudle et al. | 372/99 |
| 5,029,976 | 7/1991 | Goto | 359/328 |
| 5,185,750 | 2/1993 | Kafka et al. | 378/20 |
| 5,212,698 | 5/1993 | Kafka et al. | 372/20 |

Primary Examiner—Léeon Scott, Jr.
Attorney, Agent, or Firm—Frank D. Gilliam

[57] ABSTRACT

Producing high efficiency laser wave mixing and laser harmonic generation laser beams by reconstruction of fundamental and second harmonic laser beams from a frequency doubling crystal by use of a pair of optical wedges. The optical wedges are positioned with their angled surfaces facing each other with substantially 180 degrees of relative rotation and separated at a predetermined distance. The two spaced apart laser beams enter the first optical wedge from the frequency doubling crystal and the two beams converge after exit the first wedge. The converged laser beams enter the second wedge and exit therefrom, forming a coaxially overlapping single beam which is to be used for high efficiency generation of a higher order harmonic laser beam.

9 Claims, 1 Drawing Sheet

LASER WAVE MIXING AND HARMONIC GENERATION OF LASER BEAMS

BACKGROUND OF THE INVENTION

The invention is directed to optics and more particularly to optics through which spaced apart laser light beams emerge from a non-linear frequency crystal can be coaxially converged to produce a high efficiency higher harmonic laser light beam.

Due to the optical anisotropic nature of frequency doubling crystals, the propagation of a laser beam in such a crystal usually takes different directions for its phase front (wave vector) and its energy flow (ray vector). In a second harmonic generation process, the wave vectors of both the fundamental and harmonic beams are the same, owing to a condition called phase matching. However the ray vectors of the two beams are usually different. This is called the walk-off effect. A typical walk-off angle between the two beams is about one degree in commonly used frequency doubling crystals. As a result, at the output of the crystal, the fundamental and the second harmonic beams are parallel with a small transverse displacement. If the two beams are then directed onto a crystal for sum frequency generation, this transverse displacement will effect the efficiency of the third harmonic generation.

A present art method of producing third harmonic beams is to separate the fundamental and second harmonic beams and bring them back together to a near coaxially overlapped condition by directing the two separated beams into a dichroic mirror and then a recombination through a plurality of optics by transverse repositioning. This method requires a plurality of optic elements each of which require extensive time consuming precise placement manipulation. Additionally, the dichroic mirrors must satisfy the characteristics that for allowing high transmission efficiency at one laser wavelength and high reflection at the second wavelength. This is technically difficult to achieve, resulting in loss of laser intensity of either or both of the laser beams. Even when the plurality of optic elements are positioned as precise as possible, considerable third harmonic beam power is lost.

The present method of developing third harmonic beams has a maximum efficiency of only about 30 percent.

There has not been a simple yet precise development of third harmonic laser beams having increased maximum efficiency until the emergence of the instant invention.

SUMMARY OF THE INVENTION

The present invention uses a combination of a pair of optical wedges for coaxially superimposing a fundamental ant second harmonic laser beam developed from a fundamental laser beam passed through a doubling crystal to form a third harmonic laser beam. A first wedge is positioned to receive the spaced apart fundamental and second harmonic beams exiting the frequency doubling crystal. The two beams enter a side of the first wedge which is coated for antireflection for both incident wavelengths. The angle of incident is near normal for small separation displacement. The two beams are bent by the first wedge and exit the first wedge from an angled surface. The two beams exiting the angled side of the first wedge converge at the entrance face of a second wedge. A second wedge is positioned with an angled surface facing toward the angled surface of the first wedge. The angled surfaces which have a relative rotation of approximately 180 degrees have a near Brewster angle of incidence to both the fundamental and the second harmonic beams. The second wedge is spaced from the first wedge a distance where the two laser beams cross. The two laser beams exit a surface of the second wedge which is substantially normal to the laser beams as a coaxial superimposed single laser beam.

If it is desired to provide a selected traverse displacement between any two laser beams the pair of wedges can also be utilized for this purpose by selected spaced apart displacement of the wedges.

An object of the invention is to produce a third harmonic laser beam with an energy level near that of the fundamental laser beam.

Another object of this invention is to produce an improved apparatus for producing a highly efficient third or higher order harmonic laser beam from a fundamental laser beam.

Another object of this invention is to provide an apparatus for providing a selected transverse displacement between two separate laser beams.

Still another object of this invention is to produce a highly efficient third harmonic laser beam produced from a fundamental laser beam passed through non-linear wave mixing crystals.

Still another object of this invention is to produce a highly efficient third or higher order harmonic laser beam from a fundamental laser beam passing through a wave mixing crystal and a pair of optical wedges.

These and other objects and advantages of the present invention will become apparent to those skilled in the art after considering the following detailed specification in which the preferred embodiment are described in conjunction with the accompanying drawing Figures.

DESCRIPTION OF THE PREFERRED EMBODIMENT

Figure 1:
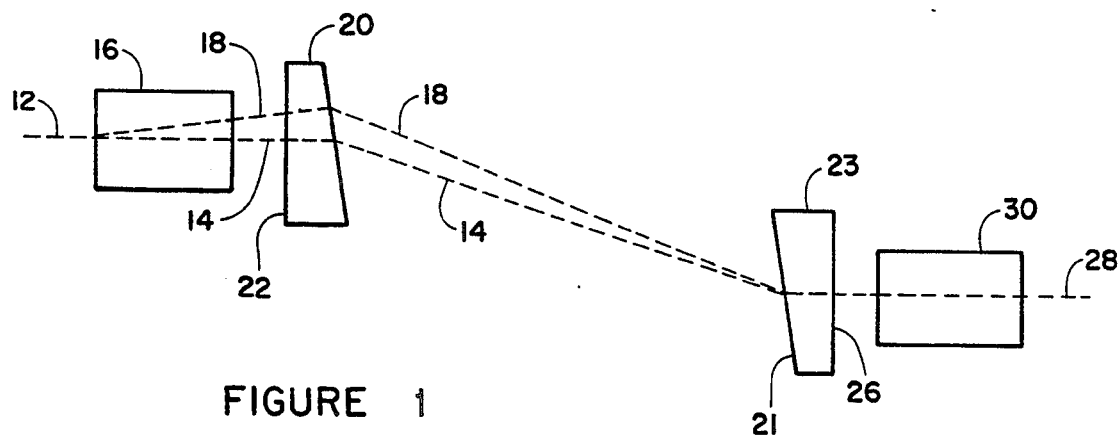
FIG. 1 represents a schematic showing of an input laser beam passing through a frequency doubling crystal, the output of the doubling crystal passing through a pair of optical wedges and exiting the wedges a single third laser beam which generates a third harmonic or higher order harmonic upon entering the subsequent non-liner mixing crystals.

As shown in drawing FIG. 1, a system 10 for producing a third harmonic laser beam 12 from a fundamental laser beam 14 is shown in this drawing Figure. The laser beam 14 can be generated from any suitable laser source. The laser beam 14 enters a doubling crystal 16 well known in the laser art suitable for the purpose intended. The fundamental laser beam 14 and a second harmonic laser beam 18 exit the doubling crystal.

A first low loss optical wedge 20 typically having an apex angle of from 0.5 to 10.0 degrees which is commonly available as laser mirror substrates or any other low loss optical wedge suitable for the purpose intended is positioned at the outpost of the doubling crystal 16. The laser beams enter the wedge 20 at a side 22 which is normal to the entering beams. The laser beams 14 and 18 exit an angled surface 24 of the optical wedge which converges the two laser beams 14 and 18 at distance "d" which is determined by the extent of the beam displacement and the wedge angle, such that the two beams cross at the entrance surface of the second wedge.

The now converged beams 14 and 18 enter the second optic wedge 23 at a surface 21 which is angled from the fundamental beam 14 entering the doubling crystal 16 and exit a surface 26 substantially parallel with surface 22 of optic wedge 20 as a combined coaxial laser beam 12.

The low loss qualities of the two optic wedges 20 and 23 and the placement of the wedges determine the efficiency of the system 10. With state of the art components including the proper choice of a third harmonic wave mixing crystal 30, a third harmonic laser beam 28 with power levels can reach as high as 90% of power level of the input laser beam 12.

If parallel fundamental and second harmonic laser beams at the output of wedge 23 are desired instead of a coaxial combined fundamental and second harmonic laser beam, the distance between the two wedges is chosen other than "d". A distance different than "d" that does not overlap the two laser beams 14 and 18 at the entering surface 21 of the wedge 23. Depending of the selected distance between the two optical wedges, other than distance "d", a selected angle of incidence between parallel directed fundamental and second harmonic beams exiting the optical wedge 23 can be achieved.

The present device can also be used to increase the displacement of the laser beam by increasing the wedge separation "d" until a desired displacement of the laser beams 18 and 14 has been reached.

After the two laser beams cross at a distance "d" there is created a co-axial and parallel output laser beam 12 as illustrated in FIG. 1.

Figure 2:
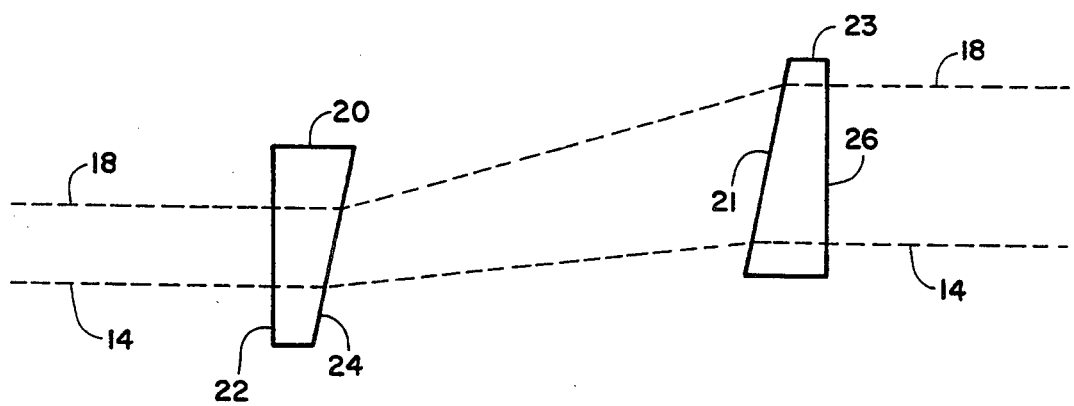
FIG. 2 is a showing similar to FIG. 1 with the pair of optical wedges each being rotated 180 degrees from the FIG. 1 to achieve an increase in the separation of the laser beams showing.

Alternately, as shown in FIG. 2, the optical wedges can be used in an orientation 180 degrees from the positions shown in FIG. 1. In this instance, the high frequency laser beam 18 (for example the second harmonic), is positioned below the lower frequency beam (as for example, the fundamental beam) as shown in FIG. 2. The larger bending angle for the higher frequency laser beam will separate the beam after emerging from wedge 20, instead of combining them as illustrated in FIG. 1.

Figure 3:
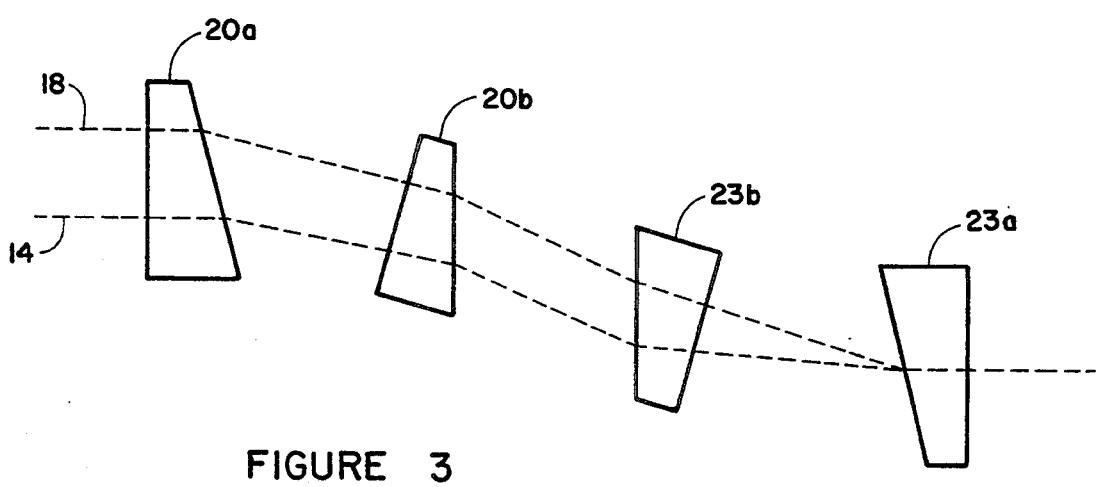
FIG. 3 is a showing of the multi-wedge pairs for increasing displacements between two laser beams.

In another embodiment, multiple wedge pairs can be used in the laser beam path to increase the laser beam displacement effect (see FIG. 3). Such multiple pairs can be arranged in series, i.e. each matched pair with similar apex angles are placed one after the next in the laser beam path or they can be arranged in parallel, i.e. all wedges 20a, 20b, etc. with their narrow dimension, tip, pointing up are arranged one after the other and the wedges with their tips pointing down 23b, 23a, etc. after the up wedge group as shown in FIG. 3.

The wedges can be made from fused silica or any other suitable material for the purpose intended. The optical wedges have apex angles between 0.5 and 10.0 degrees on surfaces 24,21 relative to surfaces 22 and 26 respectfully with a 3 degree apex angle being ideal. The surfaces 24 and 21 of wedges 20 and 23 respectfully have substantially the same angle on surfaces 24 and 21 and are positioned with their angled surface having a relative rotation of substantially 180 degrees, i.e. the two wedges have their surface angles rotated substantially 180 degrees.

OPERATION

When the fundamental beam 12 and its second harmonic laser beam 18 exit from the frequency doubling crystal 16, the fundamental laser beam and the 2nd. harmonic laser beams are displaced as shown by laser beams 14 and 18. The two laser beams 14 and 18 impinge on optical wedge 20. The fundamental beam 14 is bent at an angle smaller than the second harmonic laser beam 18. The two laser beams converge and intersect at distance "d", with the second harmonic laser beam 18. The two now converged beams enter optical wedge 23 and are deflected through the optical wedge 23 as parallel beams which are coaxial forming a single coaxial laser beam. If the distance between the optical wedges is other than "d" the two separate beams will enter the optical wedge 20a as separate laser beams 14 and 18 and exit the optical wedge again as two parallel laser beams 14 and 18 with a displacement between the two beams which depends on the displacement positions before entering the wedges.

Alternately, the device can be used for improving wave mixing efficiency such as, a fifth harmonic generation process. In such a case, the laser beam 12 now consists of two components, for example, a fundamental laser beam and a second harmonic laser beam. The nonlinear crystal is now used for frequency doubling of the second harmonic portion of the laser beam 12. Beam 18 is now the fourth harmonic after frequency doubling from the second harmonic component, and is displaced from the fundamental laser beam 14. The device can be used for recombining the fundamental laser beam and the fourth harmonic laser beam into a coaxial laser beam before entering a fifth harmonic wave mixing crystal from which a fifth harmonic laser beam is generated.

Further, the instant invention can be useful to generate laser beams with frequency equal to the sum or the difference between the any two laser beams. The device of the instant invention may be used to firstly align the two laser beams coaxially as described for the third or fourth harmonic generation process. With the appropriate choice of the non-linear optical and the proper phase-matching condition, a laser beam with a frequency equal to the sum or the difference of the two frequencies of the two laser beams before entering the non-linear crystal can be generated with improved efficiency.

The instant invention is further directed to combining any two displaced laser beams of different frequencies both coaxially and parallel to achieve improved wave mixing efficiently in non-linear optical conversion procedures.

The present disclosure includes that contained in the appended claims as well as that of the foregoing description. Although this invention has been described in its preferred form with a certain degree of particularity, it is understood that the present disclosure of the preferred form has been made only by way of example and numerous changes in the details of construction and combination and arrangement of parts and method of operation may be resorted to without departing from the spirit and scope of the invention.

What is claimed is:

1. Apparatus for changing the spacing between two laser beams of different frequencies which comprise:
   a first optical wedge having a first receiving surface and a second exiting surface for receiving a first laser beam and a second laser beam and producing a selected angular relationship between said first and second laser beams exiting said first wedge; and
   a second optical wedge having a first receiving surface and a second exiting surface, said second wedge being selectively spacedly adjustable relative to said first optical wedge for receiving said beams on said first surface and producing beams exiting from said second surface with selected relative parallel positions,
   said second surface of said first optical wedge and said first surface of said second optical wedge being substantially parallel.

2. The apparatus of claim 1 wherein the corresponding first and second surfaces said first and second optical wedges are substantially equal and have a relative rotational position of approximately 180 degrees apart.

3. The optical apparatus of claim 1 wherein the apex angle of said optical wedges are in the range of 0.5 to 10.0 degrees.

4. The apparatus as in claim 1, wherein the frequencies of the first and second laser beams are chosen among a fundamental laser frequency and higher harmonics of a fundamental frequency.

5. The apparatus as in claim 1, wherein at least one additional optical wedge is inserted in at least one of the laser beam paths after said first optical wedge, and is oriented substantially the same as the first optical wedge so that the convergence of the first and second laser beams increases.

6. The apparatus as in claim 1, wherein at least one additional optical wedge is inserted in at least one of the laser beam paths before said second optical wedge and is oriented substantially the same as said second optical wedge so that the converging beams cross at the first surface of said second optical wedge and produces coaxial and superimposed laser beams exiting the second surface of said second optical wedge.

7. The invention as defined in claim 1 where said first and second optical wedges are selective spaced to provide a coaxial and approximately superimposed first and second laser beams exiting said optical wedge beams.

8. The invention as defined in claim 1 where said first and second optical wedges are selective spaced to provide a selectively spaced apart parallel first and second laser beams exiting said optical wedge beams.

9. Apparatus for changing the spacing between two laser beams of different frequencies which comprise:
   a first optical wedge having a first and second surface said first surface for receiving a first laser beam and a second laser beam and producing a selected angular relationship between said first and second laser beams exiting said second surface of said first wedge;
   a second optical wedge having a first and second surface selectively spacedly positioned relative to said first optical wedge for said second surface for receiving said beams and producing beams with selected relative parallel positions exiting said second surface of said second optical wedge said optical wedge beams;
   said second surface of said first optical wedge and said first surface of said second optical wedge being parallel; and
   a nonlinear crystal positioned such that the coaxial and superimposed laser beams enter the nonlinear optical crystal to generate a third laser beam with a frequency equal to the sum or difference of said first and second laser beams.

* * * * *